(12) United States Patent
Kowalewski

(10) Patent No.: US 8,914,080 B2
(45) Date of Patent: Dec. 16, 2014

(54) DETERMINING DEVICE, METHOD FOR DETERMINING OF TRANSMITTING PARAMETER, ENERGY TRANSMITTING DEVICE AND METHOD FOR WIRELESSLY TRANSMITTING ENERGY

(75) Inventor: Frank Kowalewski, Goettingen (DE)

(73) Assignee: Intel Mobile Communications GmbH, Neubiberg (DE)

( * ) Notice: Subject to any disclaimer, the term of this patent is extended or adjusted under 35 U.S.C. 154(b) by 504 days.

(21) Appl. No.: 13/147,388

(22) PCT Filed: Feb. 4, 2010

(86) PCT No.: PCT/EP2010/051381
§ 371 (c)(1),
(2), (4) Date: Aug. 2, 2011

(87) PCT Pub. No.: WO2010/089354
PCT Pub. Date: Aug. 12, 2010

(65) Prior Publication Data
US 2011/0285213 A1 Nov. 24, 2011

(30) Foreign Application Priority Data
Feb. 4, 2009 (DE) .......................... 10 2009 007 464

(51) Int. Cl.
| | | |
|---|---|---|
| *H04M 1/00* | (2006.01) | |
| *H04B 1/38* | (2006.01) | |
| *H02J 17/00* | (2006.01) | |
| *H04B 17/00* | (2006.01) | |
| *H04W 12/06* | (2009.01) | |
| *H04B 5/00* | (2006.01) | |
| *H02J 7/00* | (2006.01) | |

(52) U.S. Cl.
CPC ............... *H04W 12/06* (2013.01); *H02J 17/00* (2013.01); *H04B 17/0077* (2013.01); *H02J 2007/0001* (2013.01); *H04B 5/0037* (2013.01); *H04B 1/3883* (2013.01)
USPC ........................................................ 455/572

(58) Field of Classification Search
USPC ...................... 455/572, 573, 41.1, 522, 343.1
See application file for complete search history.

(56) References Cited

U.S. PATENT DOCUMENTS 6,184,651 B1 * 2/2001 Fernandez et al. ............ 320/108
6,437,685 B2 8/2002 Hanaki
(Continued)

FOREIGN PATENT DOCUMENTS

CN 101261549 A 9/2008
CN 101330229 A1 12/2008
(Continued)

OTHER PUBLICATIONS

English language abstract of CN 101330229 A1 dated Dec. 24, 2008.
(Continued)

*Primary Examiner* — Kwasi Karikari
(74) *Attorney, Agent, or Firm* — Schwabe, Williamson & Wyatt, P.C.

(57) ABSTRACT

According to an embodiment, a determining device for determining a transmission parameter for wirelessly transmitting energy (414) from a sending device (402) to a receiving apparatus (401) is provided, comprising: an authorization checking device which is configured to carry out an authorization (403, 404, 405, 406) in order to determine whether the receiving apparatus is authorized to receive energy from the sending device, a sending/receiving apparatus which is configured to send and receive messages (409, 410, 411) during a message exchange with the receiving apparatus in order to determine the transmission parameter (413); and a parameter determining device which is configured to determine the transmission parameter (413) based on the authorization and based on the message exchange, if the receiving apparatus is authorized to receive energy from the sending device.

20 Claims, 6 Drawing Sheets

(56) References Cited

U.S. PATENT DOCUMENTS

| | | | |
|---|---|---|---|
| 7,155,165 | B1 | 12/2006 | Kowalewski |
| 7,286,590 | B1 | 10/2007 | Kowalewski |
| 7,825,543 | B2 * | 11/2010 | Karalis et al. ............. 307/104 |
| 2004/0142733 | A1 | 7/2004 | Parise |
| 2004/0145342 | A1 * | 7/2004 | Lyon ............................ 320/108 |
| 2005/0127868 | A1 * | 6/2005 | Calhoon et al. ............. 320/108 |
| 2006/0113955 | A1 | 6/2006 | Nunally |
| 2006/0250277 | A1 | 11/2006 | Colak |
| 2006/0286990 | A1 * | 12/2006 | Juan et al. .................... 455/466 |
| 2007/0007821 | A1 | 1/2007 | Rossetti |
| 2008/0014897 | A1 * | 1/2008 | Cook et al. ............... 455/343.1 |
| 2008/0122297 | A1 | 5/2008 | Arai |
| 2010/0036773 | A1 * | 2/2010 | Bennett .......................... 705/67 |
| 2010/0224725 | A1 * | 9/2010 | Perlman et al. ............... 244/1 R |

FOREIGN PATENT DOCUMENTS

| | | |
|---|---|---|
| WO | 9956441 A1 | 2/1999 |
| WO | 0027046 A1 | 3/2000 |
| WO | 2006058309 A2 | 6/2006 |
| WO | 2007090168 A2 | 8/2007 |
| WO | 2008063678 A1 | 5/2008 |
| WO | 2008114268 A2 | 9/2008 |
| WO | 2010/089354 A2 | 8/2010 |
| WO | 2010/089354 A3 | 10/2010 |

OTHER PUBLICATIONS

English language abstract of CN 101261549 A dated Sep. 10, 2008.
International Search Report and Written Opinion received for PCT Patent Application No. PCT/EP2010/051381, mailed on Aug. 17, 2010, 15 pages.
International Preliminary Report on Patentability received for PCT Patent Application No. PCT/EP2010/051381, mailed on Aug. 18, 2011, 10 pages.
Office Action received for Korean Patent Application No. 2011-7018275, mailed on Dec. 5, 2012, 4 pages of Office action and 3 pages of English Translation.
Office Action received for Chinese Patent Application No. 201080006604.7, mailed on May 23, 2013, 11 pages of Office action and 22 pages of English Translation.
Office Action received for Chinese Patent Application No. 201080006604.7, mailed on Dec. 6, 2013, 9 pages of Office action and 19 pages of English Translation.
Office Action received for European Patent Application No. 11187494.7, mailed on Sep. 30, 2013, 3 pages of Office action.
Office Action received for Korean Patent Application No. 2013-7005715, mailed on May 8, 2013, 4 pages of Office action and 4 pages of English Translation.

* cited by examiner

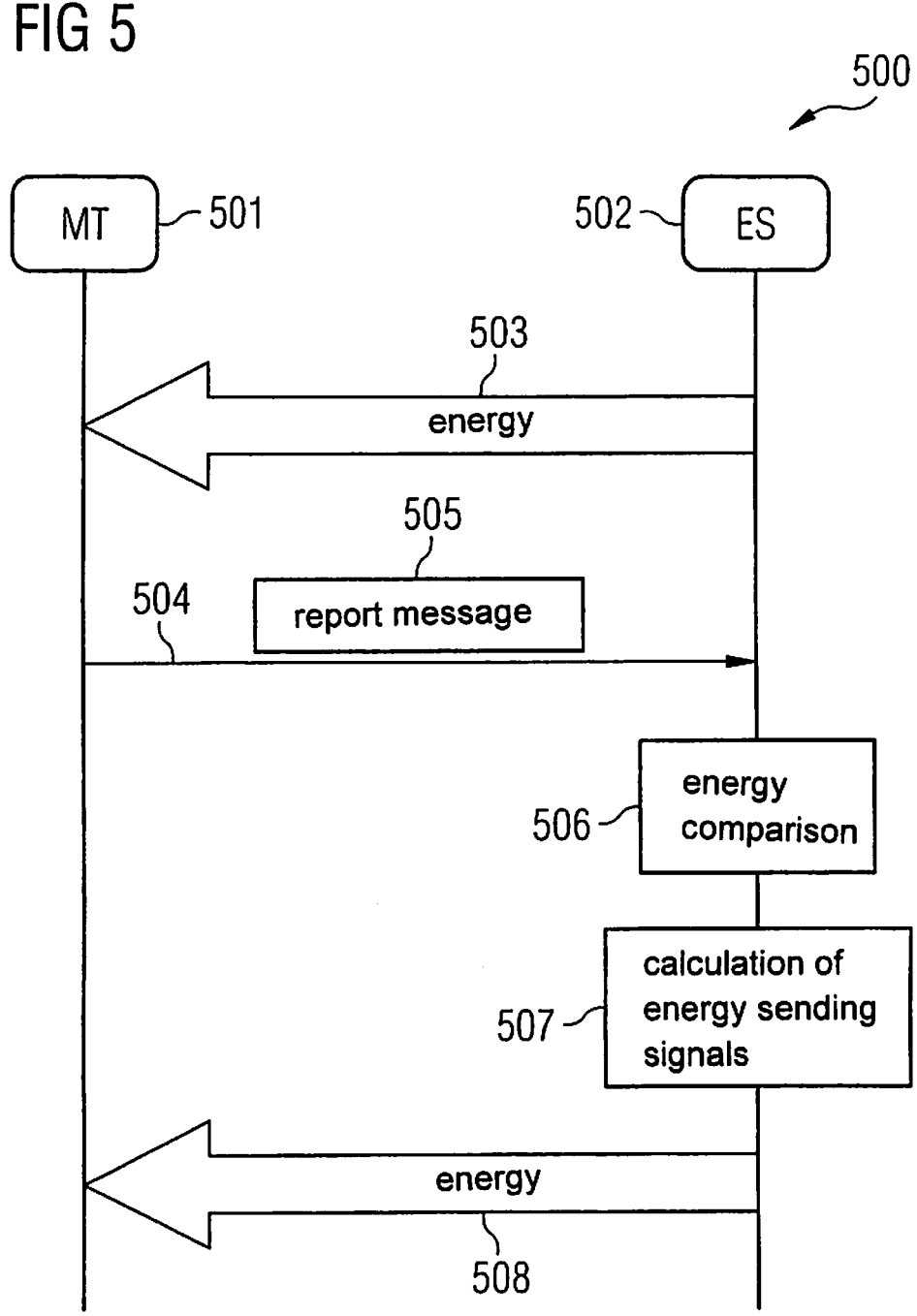

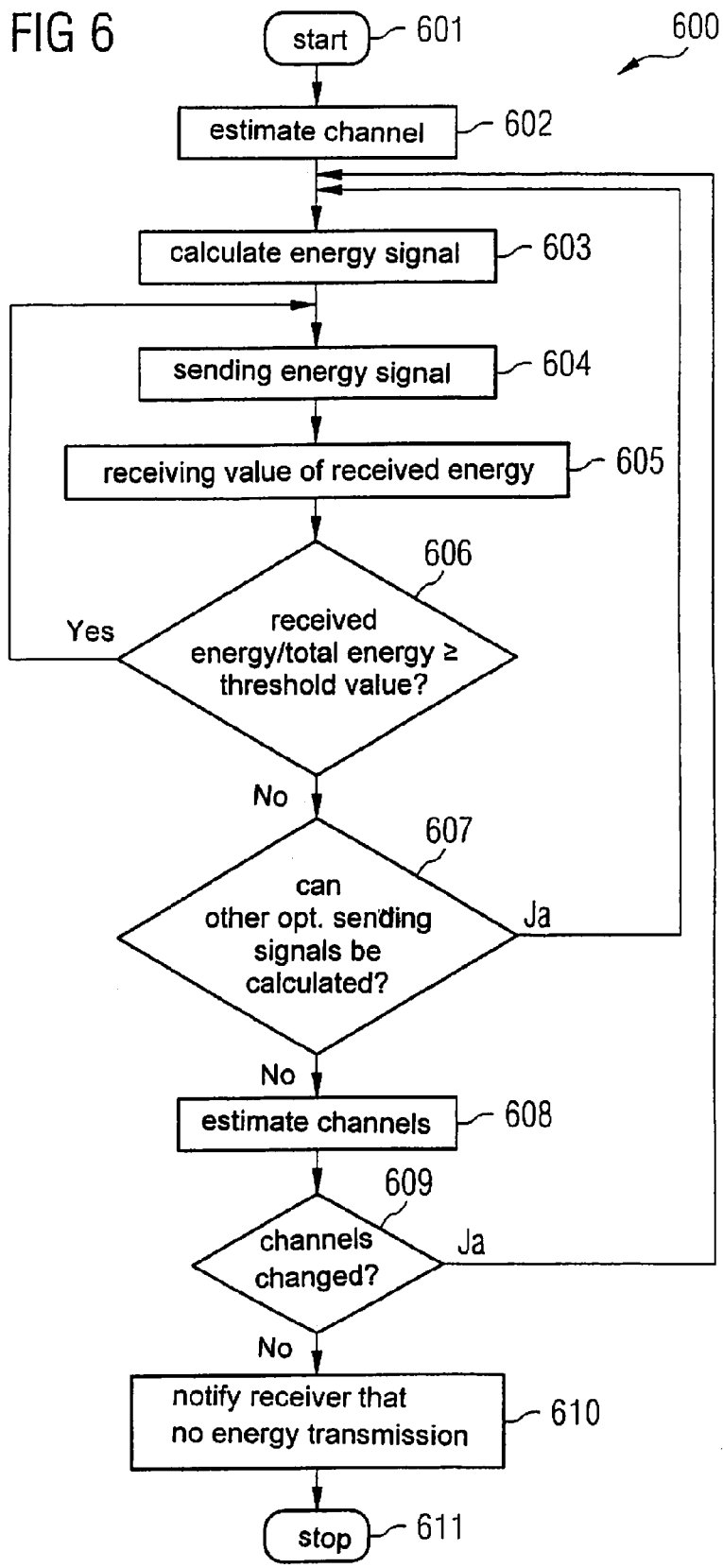

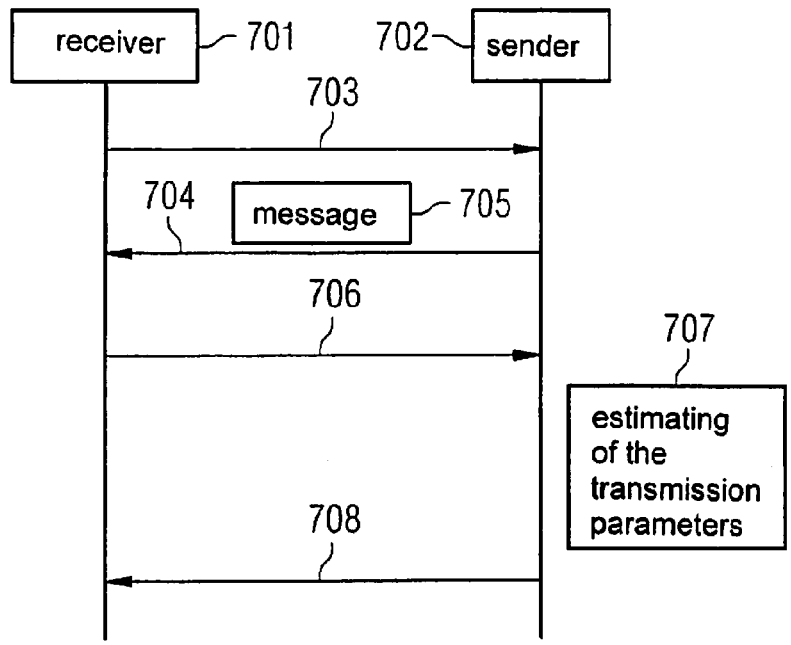
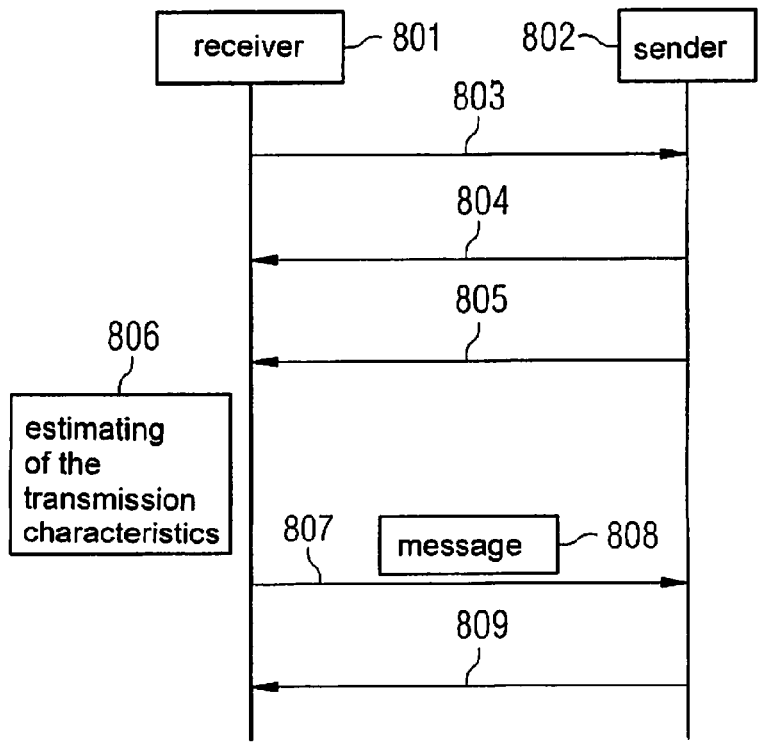

DETERMINING DEVICE, METHOD FOR DETERMINING OF TRANSMITTING PARAMETER, ENERGY TRANSMITTING DEVICE AND METHOD FOR WIRELESSLY TRANSMITTING ENERGY

RELATED APPLICATIONS

The present application is a national stage entry according to 35 U.S.C. §371 of PCT application No.: PCT/EP2010/051381 filed on Feb. 4, 2010, which claims priority from German application No.: 10 200 007 464.3 filed on Feb. 4, 2009.

TECHNICAL FIELD

Embodiments of the present invention relate to a determining device for determining a transmitting parameter for wireless transmission of energy, a method for determining a transmitting parameter, an energy transmitting device as well as a method for wirelessly transmission of energy.

BACKGROUND

In order to energize an electronic device, energy may be transmitted wirelessly, for example using electromagnetic waves, to the electronic device. However, since providing of energy causes costs, it is desirable to control who receives transmitted energy.

SUMMARY

According to an embodiment, a determining device for determining a transmission parameter for wirelessly transmitting energy from a sending device to a receiving apparatus (for example an electronic apparatus) is provided, which includes: an authorization checking device configured to carry out an authorization in order to determine whether a receiving apparatus is allowed to receive energy from the sending device; a sending/receiving apparatus which is configured to send and receive messages when exchanging messages with the receiving apparatus in order to determine the transmission parameter; and a parameter determining device which is configured to determine the transmission parameter based on the authorization and based on the message exchange if the receiving apparatus is allowed to receive energy from the sending device.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 5 shows a message flowchart diagram according to an embodiment;

FIG. 6 shows a flowchart diagram according to an embodiment;

FIG. 7 shows a message flowchart diagram according to an embodiment;

FIG. 8 shows a message flowchart diagram according to an embodiment.

DETAILED DESCRIPTION

Figure 1:
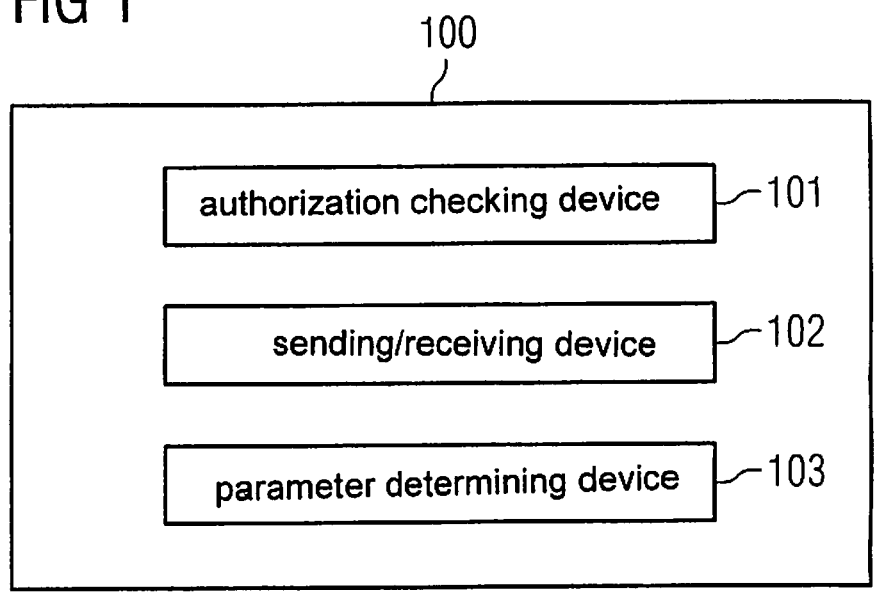
FIG. 1 shows a determining device according to an embodiment.

The following detailed description refers to the accompanying drawings that show, by way of illustration, specific details and embodiments in which the invention may be practiced.

Electrical energy is often transmitted wirelessly, for example using induction. Transmitting energy using induction is done using a sender coil in which a varying magnetic field is generated which induces an electric current in a receiving coil. The energy may thus be transmitted over relatively small distances, typically in the range of centimeters.

Further, electric energy may be transmitted via electromagnetic waves. In this approach, electromagnetic waves are radiated from a sending antenna which is provided with an oscillating voltage. A further antenna receives the electromagnetic waves and converts them into an electric current. Using this technology, the energy may be transmitted over comparatively large distances, typically in the range of kilometers. Further, it is possible to radiate electromagnetic waves in particular directions in a concentrated manner using directional antennas or several antennas which are controlled in a suitable manner.

Electric energy may also be transmitted using laser radiation. In this technology, electrical energy is converted into spatially strongly focused light which is also strongly focused regarding the frequency using a laser. The light beam is received using a light converter and is converted into an electrical current. The transmission using laser radiation may be interpreted as a special case of a transmitting strong directional electromagnetic waves.

If resonating receivers are used, electrical energy may be transmitted if electromagnetic waves are used efficiently over mid range distances like in the range of meters. In this example, electromagnetic fields of a particular form/shape are generated which propagate only over a limited distance. Here, the electromagnetic waves are radiated into all directions. A receiving oscillating circuit substantially receives/takes energy only from electromagnetic waves which correspond to its eigen-frequency. Objects having an eigen-frequency which does not correspond to the frequency of the radiated waves do not receive energy or receive only little energy from the electromagnetic field and therefore do not disturb the electromagnetic field.

The propagation of electromagnetic waves is typically disturbed by objects located in the proximity. The electromagnetic waves may be changed using diffraction, refraction and reflection. Signals may be sent using electromagnetic waves such that disturbances are taken into account. The disturbances may be taken into account such that a resulting receiving signal which is received by a receiving apparatus is optimum for this receiver.

In the following, "optimum" or an "optimum configuration" for example of a signal, for example a configuration is understood which is optimum regarding a predetermined optimum criteria (which for example bases on a transmission model for an electromagnetic wave), in other words, which represents an optimum solution of an optimization problem corresponding to the optimization criteria. "Optimum" may be, however, in other embodiments, a "very good" solution, i.e. a configuration which fulfils the predetermined optimum criteria very good, for example, which deviates from the optimum criteria (regarding a predetermined measuring unit) only within a predetermined tolerance range.

Electromagnetic waves may also be radiated by a plurality of antennas such that they are received from a particular receiving apparatus in an optimum manner.

Typically, when radiating electrical energy using electromagnetic waves, when the electromagnetic waves are radiated undirectionally, the energy transmission is not efficient. When directionally transmitting electromagnetic waves in order to transfer energy, the case may occur that the electromagnetic waves are disturbed by objects located along the transmission direction. Thus, the efficiency of the energy transmission may be significantly reduced.

Further, when radiating wirelessly energy, there may occur the case that the energy is received by undesired receivers to which the energy actually should not be transmitted, i.e. receiver may receive energy which should not receive energy (from the viewpoint of the provider of the transmitted energy).

One idea which underlies embodiments may be seen in that the electromagnetic field which is formed from an energy sender, for example from an energy supply device, is formed spatially and temporarily such that a selected receiver receives the energy in an optimum manner. The generated electromagnetic field can be formed such that undesired (non selected) receiver receive little energy via the generated electromagnetic field as possible. The electromagnetic field may for example be selected in dependence on the transmission characteristics of energy signals, i.e. of signals which are for example (very) suitable for transmitting energy from the energy sender to be energy receiver. The transmission characteristics, for example transmission parameter, can be determined (e.g. measured) by the energy sender or by the receiver using test signals which are for example transmitted between the energy sender and the receiver. The used test signals may for example be negotiated between the energy sender and the receiver.

According to an embodiment, the negotiation of test signals for determining a transmission characteristic of energy signals between the energy sender and the energy receiver is carried out when authorizing the receiver, for example when authorizing in the receiver at the energy sender or at an authorization device coupled to the energy sender.

According to embodiments, electrical energy may be transmitted over mid range distances efficiently. In addition, it can be avoided that the energy transmission is disturbed by objects located within the transmission path. According to embodiments, it is possible that an undesired receiver, for example a receiver which is not allowed to receive energy from the energy sender, or to which no energy from the energy sender should be transferred, receives as little energy as possible. A desired energy receiver, for example a receiver which is allowed to receive energy from the energy sender, can be determined using for example an authorization.

According to an embodiment, a determining device for determining one or several transmission parameter(s) for wirelessly transmitting energy from a sending device to a receiving apparatus is provided. An example of such a determining device is illustrated in FIG. 1.

FIG. 1 shows a determining device 100 according to an embodiment.

The determining device 100 includes an authorization checking device 101 which is configured to carry out an authorization in order to determine whether the receiving apparatus is authorized to receive energy from the sending device.

The determining device 100 further includes a sending/receiving apparatus 102 which is configured to send and receive messages when exchanging messages with the receiving apparatus in order to determine the transmission parameter(s).

The determining device 100 further includes a parameter determining device 103 which is configured to determine the transmission parameter(s) based on the authorization and based on the message exchange if the receiving apparatus is authorized to receive energy from the sending device.

The determining device does not have to be provided within a apparatus, but may also be distributed over several apparatuses. For example, the parameter determining device may be provided within the energy receiver, for example a mobile apparatus, for example a mobile phone, for example a mobile wireless phone, and the authorization device may be provided within the energy sender, for example a stationary energy supplying device. Thus, "device" may be understood as an arrangement distributed over several apparatuses or arrangements.

Figure 2:
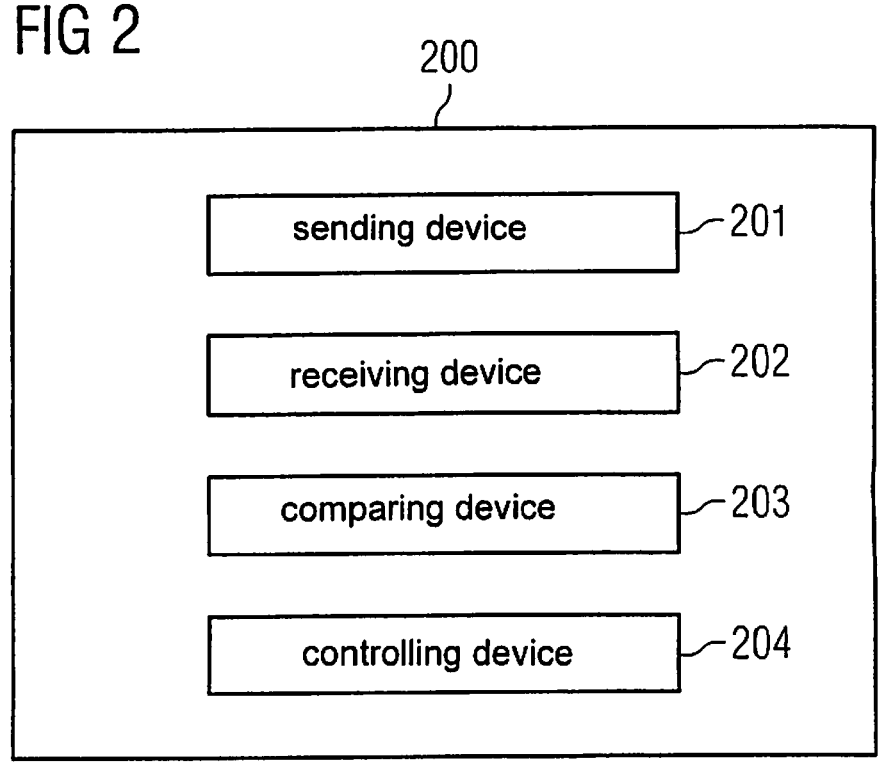
FIG. 2 shows an energy transmission device 200 for wirelessly transmitting energy to a receiving apparatus.

According to an embodiment, an energy transferring device is provided, as shown in FIG. 2.

FIG. 2 shows an energy transmission device 200 for transmitting of energy wirelessly to a receiving apparatus.

The energy transmission device 200 includes a sending device 201 configured to radiate energy.

The energy transmission device 200 shows a receiving apparatus 202 which is configured to receive a message from the receiving apparatus out of which the amount of energy which has been provided to the receiving apparatus via the radiated energy can be determined.

The energy transmission device 200 further includes a comparing device 203 which is configured to compare the amount of radiated energy with the amount of energy supplied to the receiving apparatus.

A controlling device 204 of the energy transmission device 200 is configured to control the sending device 201 to further radiate energy to the receiving apparatus based on the comparison.

Within the scope of this description, the terms "coupled" or "connected" may respectively mean directly coupled/connected or indirectly coupled/connected.

A memory which is used in the embodiments may for example be a volatile memory, for example a DRAM (Dynamic Random Access Memory) or a non-volatile memory, for example a PROM (Programmable Read Only Memory) memory, a EPROM (Erasable PROM) memory, a EEPROM (Electrically Erasable PROM) or a flash memory, for example a floating gate memory, a charge trapping memory, a MRAM (Magnetoresistive Random Access Memory) memory or a PCRAM (Phase Change Random Access Memory) memory.

The term "device" may for example be a circuit or a plurality of circuits which may be located in different apparatuses.

According to an embodiment, "circuit" may be understood as any unit which interprets logic, and which may be hardware, software, firmware or any combination thereof. Thus, "circuit" may be understood, according to one embodiment, as a hard wired logic circuit, or as a programmable logic circuit, for example a programmable processor, for example a microprocessor (for example a CISC (Complex Instruction Set Computer) processor or a RISC (Reduced Instruction Set Computer) processor. The term "circuit" may also mean a software implemented on a processor, or a software carried out by a processor, for example a computer program, for example a computer program written in program code for a virtual machine like a Java computer program. The term "circuit" may, according to one embodiment, mean each kind of implementation of the functionality which is described in the following description.

Figure 3:
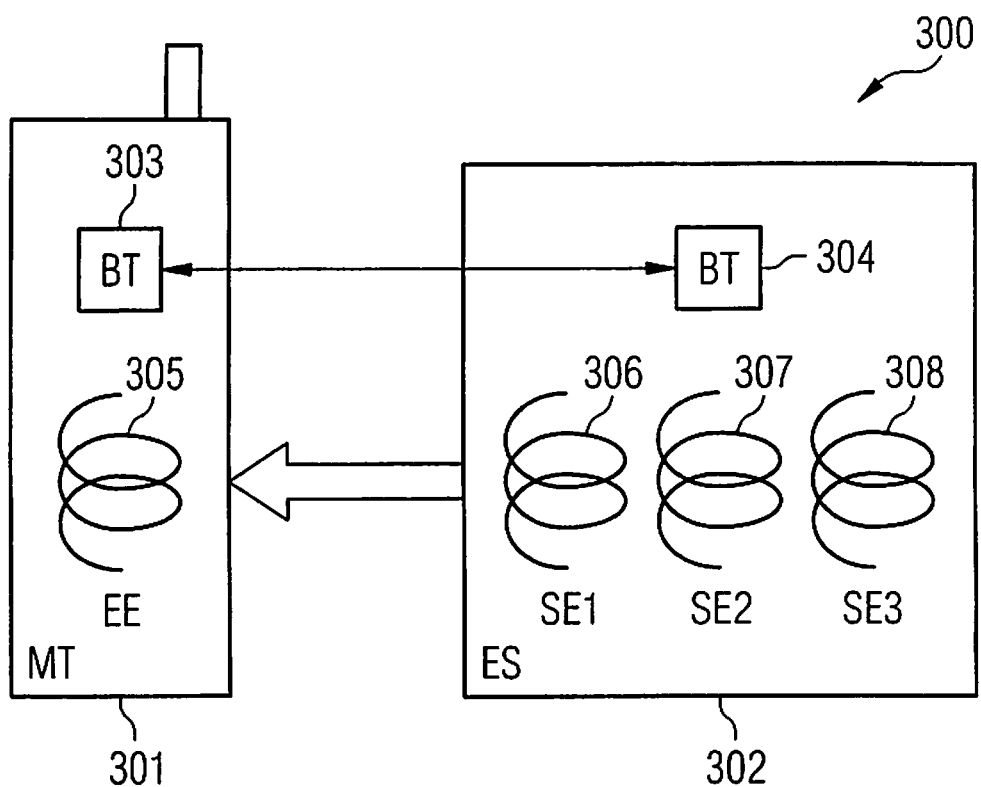
FIG. 3 shows a communication arrangement according to an embodiment.

FIG. 3 shows a communication arrangement 300 according to an embodiment.

A communication arrangement 300 includes a receiver, here a mobile phone 301 and an energy supply device 302, which in the following may also be named as energy sender, sender, or energy sender station. The mobile phone 301 includes a first sending/receiving apparatus 303, and the energy supply device 302 includes a second sending/receiving apparatus 304. Via the sending/receiving apparatuses 303, 304 the mobile phone 301 and the energy supply device 302 can communicate, for example wirelessly, for example using one of the communication technologies Bluetooth, WLAN (Wireless Local Area Network), DECT (Digital Enhanced Cordless Telecommunications), RFID (Radio Frequency Identification) or for example using a mobile communication technology, for example GSM (Global System for Mobile Communications, UMTS (Universal Mobile Telecommunications System), FOMA (Freedom of Mobile Access) or CDMA2000 (CDMA: Code Division Multiple Access). The sending/receiving apparatuss 303, 304 may also be configured to communicate wire based or cable based.

The mobile phone 301 includes an energy receiving apparatus 305. The energy supply device 302 includes in this example a plurality of energy sending devices 306, 307, 308, via which the energy supply device 302 may radiate energy, for example using electromagnetic waves, which can be received by the mobile phone 301 using the energy receiving apparatus 305.

For example, the user of the mobile phone 301 may not want to load the mobile phone 301 in a stationary manner, for example by using of a power supply pack which is coupled to the mobile phone 301 and to a power point in order to remain reachable via his mobile phone 301, but may want to supply the mobile phone 301 with energy using the energy receiving apparatus 305 which may for example be realized as coil or antenna. The energy supplying station 302 may for example be operated by the user in his apartment. If the mobile phone 301 has to be supplied with energy from the energy supply station 302, for example because the accumulator of the mobile phone 301 has to be charged, the mobile phone 301 initiates a communication connection, for example via Bluetooth, between the first sending/receiving apparatus 303 to the second sending/receiving apparatus 304 of the energy supply device 302. Via the thus generated communication connection, the mobile phone 301 will for example firstly be authorized at the energy supply device 302. For example, the energy supply device 302 determines whether the mobile phone 301 is authorized to receive energy from the energy supplying station 302 and that the mobile phone 301 is authorized to request that the energy supplying device 302 transmits energy to the mobile phone 301.

The authorization of the mobile phone 301 at the energy supply device 302 may be carried out automatically using authorization information stored within the mobile phone 301, or for example by requesting of necessary authorization information from the user of the mobile phone 301. For example, the user 301 may be requested to enter a password or a secret number code via which the energy supply device 302 may determine whether the user, and thus his mobile phone 301 is authorized to receive energy from the energy supply device 302.

In this example, a test signal, for example a training sequence, and a frequency or a frequency range is assigned to the mobile phone 301 as soon as it has been authorized by the energy supply device 302. The test signal and the assigned frequency or the assigned frequency range can be indicated to the mobile phone 301 by the energy supply device 302 for example using a respective identifier.

Figure 4:
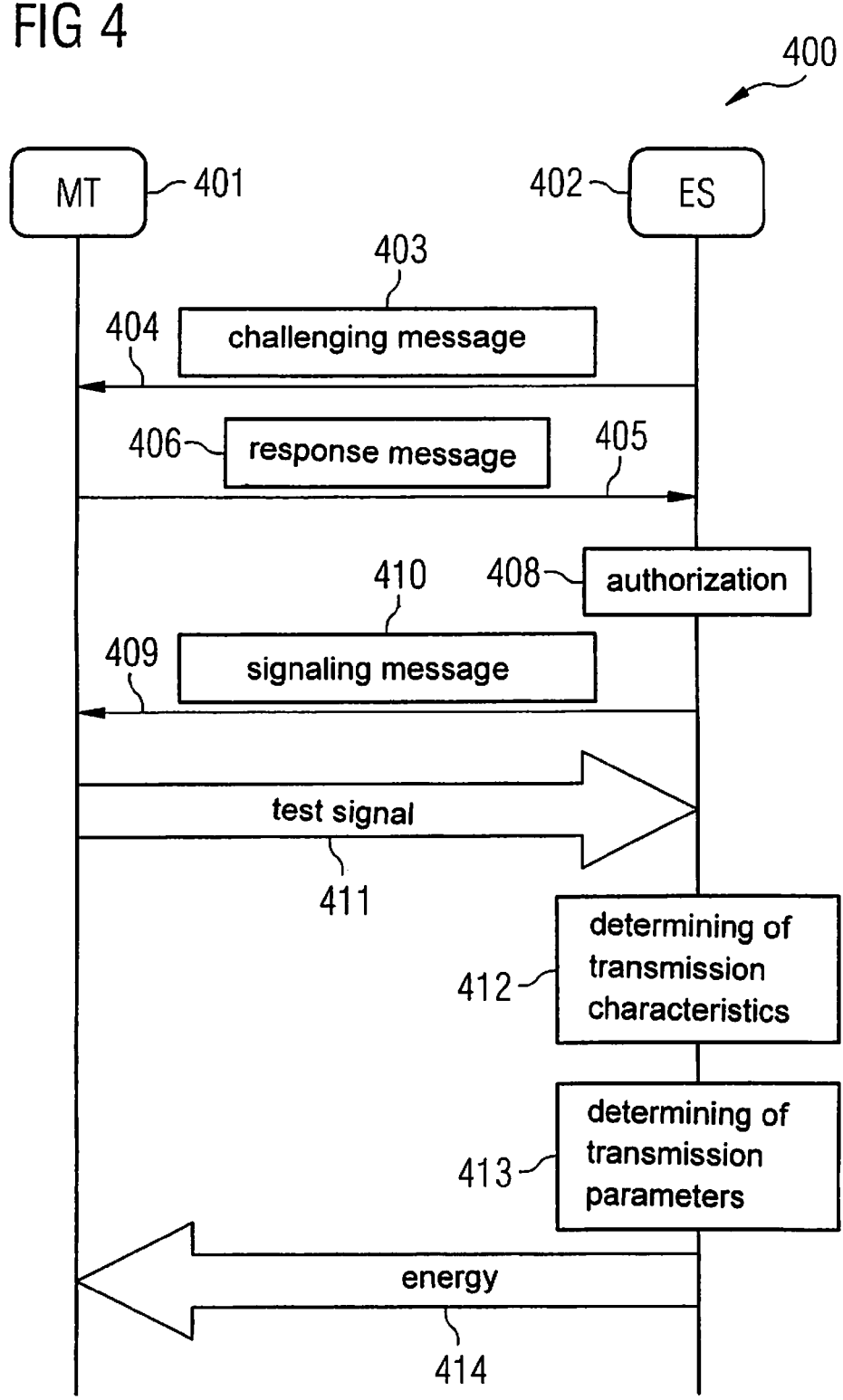
FIG. 4 shows a message flowchart diagram according to an embodiment.

The preceding and also the further flow is indicated in FIG. 4.

FIG. 4 shows a news flowchart diagram 400 according to an embodiment.

The news flow indicated takes place between a mobile phone 401, for example the mobile phone 301 of the communication device 300, and an energy supply device 402, for example the energy supply device 302 of the communication arrangement 300 as indicated in FIG. 3.

In this example, the authorization of the mobile phone 401 at the energy supply device 402 is carried out using the transmission of a challenge message 403 at 404 from the energy supply device 406 to the mobile phone 401. In order to be successfully authorized, the mobile phone 401 has to answer to the challenge message 403 in the right way, for example, by transmitting a particular authorization information, for example a password. At 405, the mobile phone 401 transmits correspondingly an answer message 406 to the energy supply device 402. It is assumed that the answer message 406 meets the requirements of an authorization, and correspondingly, at 408, the mobile phone 401 is authorized by the energy supply device 402, for example by using an authorization checking device of the energy supply device 402.

In the case in which the answer message 406 does not meet the requirements of an authorization, the mobile phone 401 is for example not authorized at the energy supply device 402. The flow is terminated in this case, or the mobile phone 401 again is given a chance to transmit a corrected answer message 406 as an answer to the challenge message 403. If the mobile phone 401 is not authorized, the energy supply device 402 for example regards it as undesired receiver which is not authorized to receive energy from the energy supply device 402.

At 409, the training sequence and may be the frequency or the frequency range assigned to the mobile phone 401 are indicated to the mobile phone 401 using a corresponding signaling message 410.

At 411, the mobile phone 401 sends the assigned test signal using the energy receiving apparatus 305 (for example a receiving coil or a receiving antenna) to the energy supply device 402, for example by using the assigned frequency or the assigned frequency range. The energy supply device 402 receives the radiated test signal, for example using the energy sending devices 306, 307, 308.

At 412, the energy supply device 402 determines, for example using a determining device provided for this purpose, transmission characteristics of the transmission between the energy receiving apparatus 305 and the energy sending devices 306, 307, 308 based on the received training sequence 411. For example, the energy supply device 402 estimates the pulse responses of the transmission channels between the energy receiving element 305 of the mobile phone 401 and the energy sending devices (or the energy sending elements) 306, 307, 308 of the energy supply device 402). For example, for each energy sending device 306, 307, 308 of the energy supply device 302, an estimation of the corresponding channel pulse response of the transmission channel between the energy receiving apparatus 305 and the corresponding energy sending element 306, 307, 308 is carried out.

Based on the determined transmission characteristics, the energy supply device 402 determines at 413 transmission parameter(s) for the transmission of energy from the energy supply device 402 to the mobile phone 401. For example, the determined transmission parameter(s) define the signal form for energy signals which are sent by one or several of the energy sending devices 306, 307, 308 for transmission of energy to the mobile phone 401 from the energy supply device 402.

At 414, the energy supply device 402 transmits energy to the mobile phone 401 according to the determined transmission parameter, for example by using of energy signals which are formed depending on estimated impulse responses of the transmission channel(s) between the energy receiving element (energy receiving apparatus) 305 and the energy sending devices 306, 307, 308. The energy signals are for example formed such that the energy transmission is optimum or as good as possible regarding the determined transmission characteristics (for example based on a predetermined transmission model). Additionally or alternatively, if the energy supply device 302 transmits energy to the mobile phone 301, the mobile phone 301 may report back how much energy has been received by the energy supplying device 302, and the energy supply device 302 carries out the further radiating of energy to the mobile phone 301 based on this information, for example based on a comparison of the radiated energy with the energy received by the mobile phone 301. A corresponding flow according to this embodiment is shown in FIG. 5.

FIG. 5 shows a message flow diagram 500 according to one embodiment.

The illustrated message flow takes place between a mobile phone 501, which for example corresponds to the mobile phone 301 of the communication arrangement 300, and an energy supply device 502 which for example corresponds to the energy supply device 302 of the communication arrangement 300.

At 503, the energy supply device 502 transmits energy to the mobile phone 501.

At 504 the mobile phone 501 transmits a report message 505 using the sending/receiving apparatus 305, for example, using Bluetooth, to the energy supply device 502, via which it is indicated to the energy supply device 502 how much energy the mobile phone 501 has received or receives from the energy supply device 502.

At 506, the energy supply device 502 compares the radiated energy with the energy received by the mobile phone 501.

Based on this comparison, for example the further energy transmission to the mobile phone 501 is carried out. For example, the energy supply device 502 calculates in 507 if the transmission efficiency is too low, for example if a ratio of the energy received by the mobile phone 501 to the energy radiated by the energy supply device 502 is very low, for example is below a predetermined threshold value, other energy sending signals, for example energy sending signals with a different form compared to the form of the energy sending signal is used for transmission of energy at 503 which also are optimized for the energy transmission, for example according to determined transmission characteristics between the mobile phone and the energy supply device 502.

For example, several solutions exist for an optimization of the energy sending signals and, if the transmission efficiency is low, a different solution as the solution used up to this point for energy transmission is used. This alternative energy signals are possibly better for energy transmission to the mobile phone 501 in a way that the energy transmission is more efficient, since for example undesired receiver of the energy using the alternative sending signals receive less energy than using the sending signals used before.

At 508, energy is transmitted from the energy supply device 502 to the mobile phone 501 using the possibly new selected energy sending signals.

Further, the energy supplying device 502 may request the mobile phone 501 to transmit the test signal to the energy supply device 502 again if the energy supply device 502 is not able to determine alternative energy sending signals which are optimum or sufficiently efficient. The energy supply device 502 may in this case determine the transmission characteristics of the transmission between the mobile phone and the energy supply device 502 again. For example, the energy supplying device 502 may determine new transmission parameters if the estimated transmission characteristics (for example estimated pulse responses) are different (have changed) compared to previously determined transmission characteristics (for example, estimation of pulse responses). For example, the energy supply device 502 determines new energy sending signals (optimum for the energy transmission) and sends them.

If, during a repeated determination of the transmission characteristics the transmission characteristics have not changed since the last determination of the transmission characteristics, and if the efficiency of the energy supply device is too low, for example if the ratio of received energy to radiated energy lies below a predetermined threshold value, according to an embodiment, the energy transmission may be terminated, and the energy supply device 502 may communicate this to the mobile phone 501. The mobile phone 501 may for example request the user of the mobile phone 501 to change his location, thereby changing the location of the mobile phone 501.

In the following, a flowchart for energy transmission from the energy supply device 502 to the mobile device 501 referring to FIG. 6 will be given.

FIG. 6 shows a flowchart diagram 600 according to an embodiment.

The flowchart starts at 601.

At 602, the energy supply device 302 determines transmission characteristics of at least one communication channel which may be used to transfer energy between the energy by device 302 and the mobile phone 301.

At 603, the energy supply device 302 determines energy sending signals for transmitting energy to the mobile phone 301 based on the results of 602.

At 604, the energy supply device 302 sends out the determined (calculated) energy sending signals.

At 605, the energy supply device 302 receives from the mobile phone 301 the information how much energy of the radiated energy could be received by the mobile phone 301.

At 606, the energy supply device 302 determines whether the ratio of the amount of energy which has been received by the mobile phone 302 to the amount of energy which has been radiated from the energy supply device 302 in order to supply the mobile phone 301 lies above a predetermined threshold value. If this is the case, at 604 it is continued with the sending of the energy sending signals determined.

If this is not the case, it will be checked at 607 whether alternative energy sending signals, for example energy sending signals, also (like the energy signals used at 604) ensure, based on the determined transmission characteristics, optimum energy transmission (referring to the determined transmission characteristics).

If this is the case, the flowchart returns to 603, and the alternative energy sending signals are calculated.

If this is not the case, the transmission characteristics of the transmission between the mobile phone 301 and the energy supply device are determined in an analogue manner with respect to 602 at 608. At 609, it is proven whether the transmission characteristics have been changed. If this is the case, the flowchart returns to 603. If this is not the case, the mobile phone 301 is informed at 610 that no energy transmission is carried out at this time, and the flowchart is terminated at 611.

The energy supplying device 302 may further communicate to the mobile phone 301 at which point of time the mobile phone 301 (repeatedly) should transmit the test signal to the energy supplying device 302, for example it can be communicated that the mobile phone 301 should repeat the transmission of the test signal periodically. At these points of time the energy supplying device 302 estimates the transmission characteristics of the transmission channel(s) between the mobile phone 301 and the energy supplying device 302 (again). If the transmission characteristics have been changed, the energy supply device 302 may determine optimized energy sending signals, and may transmit energy using these energy sending signals to the mobile phone 301. This approach can be in particular adopted if the energy transmission has been temporarily interrupted due to the low transmission efficiency.

The determination of the energy sending signals to be used, i.e. generally of the transmission parameters to be used for the transmission of energy from the energy supplying device 302 to the mobile phone 301 may be carried out depending on the determined transmission characteristics in different ways. For example, the energy sending signals may be adopted with respect to their frequency (or with respect to their frequency range), their phase and their signal basic form.

For example, the energy sending signals which are radiated from different energy sending devices 306, 307, 308 may be delayed using phase adaptations such that the main components of the energy signals which are transmitted between the energy sending devices 306, 307, 308 and the mobile phone 301 using the transmission channels constructively interfere, i.e. constructive superposition of energy sending signals sent by the different energy sending devices 306, 307, 308 at the energy receiving apparatus 305 occurs.

For example particular spatial areas will be provided with a lot of energy when radiating signals using different antennas, whereas other areas will be provided with little or no energy.

The more sending elements (energy sending devices) 306, 307, 308 are used in order to radiate the energy to be transferred, the more detailed the optimum energy transferring can be influenced, i.e. the more exactly the spatial areas may be defined which are supplied best with energy. Thus, for example, using several or a plurality of sending elements 306, 307, 308, several spatial areas (locations) having optimum energy transmission, and several locations having minimal energy transmission, may be defined.

Thus, for example, at particular locations in an apartment of the user, a high energy transferring efficiency may be achieved, whereas at particular locations of a neighboring apartment, a very little energy transferring efficiency may be achieved.

This may be desirable, if it should be avoided that a user in a neighboring apartment receives energy with a receiver from the energy supplying device 302.

According to an embodiment, the energy transmission does not need authorization. This may for example be useful if the energy is provided independently from the user, for example in a hotel.

In addition, according to an embodiment, the energy supply device 302 may not send energy sending signals if presently no receiver is authorized at the energy supplying device 302 for receiving of energy.

Embodiments may also be used for energy transmission systems for which resonance reception of transmitted energy is used. Here, different resonance frequencies may be distributed for different (eventually authorized) receiver. For example, the energy supplying device 302 may communicate to a receiver a resonance frequency assigned to the receiver, for example during an authorization of the receiver. In this scenario, the parameter determining device may be interpreted as the unit in the energy receiver which receives the assigned resonance frequency (in this case the transmission parameter(s) to be determined), thereby determining it during a message exchange. In this embodiment, the authorization device would be located in the energy sender. Thus, this is an example for the case that the authorization device and the parameter determining device may be located within different apparatuses, respectively.

According to an embodiment, the same transmission technology as used for transmitting energy from the energy sender to the energy receiver is used for negotiating (for example for negotiating of a so-called test signal) between a receiver, (for example, the mobile 301) and the energy sender (for example, the energy supplying device 302), and perhaps for authorizing the energy receiver at the energy sender. As an alternative to the negotiation of one or several test signals and other parameters to be used, according to one embodiment, one or more test signals and parameters may be assigned in a fixed manner to an energy receiver, for example to a SIM (Subscriber Identity Module) card of a mobile participating apparatus.

In addition thereto, according to an embodiment, the energy receiver (for example the mobile phone 301) may comprise several energy receiving apparatuss 305, for example coils or antennas, wherein these are used for receiving of transmitted energy.

The sending/receiving apparatuss 303, 304 of the energy receiver and the energy sender 302 may be embodied differently.

Also, the energy sending devices 306, 307, 308 may differ from each other and may differ from the energy receiving apparatus(s) 305 (at least partly).

The determination of the transmission characteristics of one or several transmission channels between the energy sender and the energy receiver which are used for energy transmission, may be repeated, for example periodically.

According to an embodiment, the energy sending signals are formed such that the transmitted energy is minimal at particular predetermined locations within the space. Thus, the energy transmission to undesired user (undesired receiver) may be selectively suppressed. For example, the energy sending signals may be formed such (more generally: the transmission parameter(s) may be chosen such that) no or little energy may be received at locations outside of a predetermined user area (for example the regular user area), for example within a neighboring apartment of the user.

Further, according to an embodiment, the energy sending signal used for energy transmission may be negotiated between the energy sender and the energy receiver. For example, the modulation of the energy sending signal may be negotiated between the energy sender (for example the energy supplying device 302), and the energy receiver (for example the mobile phone 301). For example, pseudo random sequences may be negotiated as modulation sequence.

The authorization of an energy receiver at the energy sender may be coupled to a payment process. This may for example be provided in energy supplying devices of mobile electrical apparatuses at public places.

Embodiments may not only used for energy supply, but also for information transmission, for example between the energy sender and the energy receiver.

According to an embodiment, not the energy supply device 302 or not the energy supply device 302 alone determines the transmission characteristics, but the energy receiver, for example the mobile phone 301. For example, the energy sender may communicate to the energy receiver which test signal or which test signals are radiated from the energy sender. The energy sender uses this test signals or these test signals via the energy sending devices 306, 307, 308. Different test signals may be sent from different energy sending devices 306, 307, 308. The energy receiver receives the sent-out test signals or the sent-out test signal and determines, based thereon, transmission characteristics of the energy transmission of the energy sender to the energy receiver.

The estimated transmission characteristics or transmission parameters determined by the energy receiver (for example from a parameter determination device of the energy receiver) based on the estimated transmission characteristics, are communicated from the energy receiver to the energy sender, for example using Bluetooth.

In order to avoid that an energy receiver which is not authorized to receive energy from the energy sender transmits transmission parameters or estimated transmission characteristics to the energy sender which for an energy transmission to the energy receiver would be optimum or from which a very efficient energy transfer to the non-authorized energy receiver would result, the message exchange between the energy receiver and the energy sender may be carried out encrypted after authorization of the energy receiver at the energy sender has been carried out.

An example for such a measure is shown in FIG. 7.

FIG. 7 shows a message flowchart diagram 700 according to an embodiment.

The message flow shown takes place between an energy receiver 701 and an energy sender 702, for example an energy supply device.

The energy receiver 701 is for example a portable electronic apparatus, for example an electronic communication apparatus like a cellular phone participant apparatus or a portable telephone.

At 703, an authorization of the energy receiver 701 at the energy sender 702 is carried out. This may for example be done, as indicated in FIG. 4, by using a challenge message 403 and a corresponding response message 406.

In this example, it is assumed that the energy sender 702 determines the transmission characteristics.

During the authorization at 703, it is possible in this context to negotiate one or several keys between the energy receiver 701 and the energy sender 702 in order to encrypt the message exchange during the determination of the transmission characteristics, for example a symmetrical key or one or several pairs of public key and private key.

For example, the sender 702 communicates at 704 to the energy receiver 701 in an encrypted manner which test signal the energy receiver 701 should transmit to the energy sender 702 in order to estimate the transmission characteristics. The test signal to be used, for example a pseudo random sequence may be explicitly indicated in a message 705, or also be identified using an identification, for example an index of an entry of a list of test signals.

Since the message 705 is encrypted, an energy receiver which is not authorized for receiving of energy, cannot determine which test signal is to be transmitted in order to transmit the transmission characteristics to the energy sender 702.

Thus, the non-authorized energy receiver could only transmit a false test signal to the energy sender 702, which would however yield to an estimation of transmission characteristics, since the energy sender 702 expects a different test signal, from which transmission parameter would result which (with a high probability) would yield to an energy transfer with low efficiency to the non-authorized energy receiver.

At 706, the (authorized) energy receiver 701 transmits the test signal indicated by the message 705 (or transmits also several test signals which have been indicated using the message 705) to the energy sender 702.

At 707, the energy sender 702 estimates the transmission characteristics and determines the transmission parameter based on this estimation.

At 708, the energy sender 702 transmits energy to the energy receiver 701 based on the particular transmission parameters, for example using a calculated signal form.

A further example for an encrypted message exchange (or at least a partially encrypted message exchange) for estimation of the transmission characteristics is illustrated in FIG. 8, wherein in this example the energy receiver carries out the estimation of the transmission characteristics.

FIG. 8 shows a message flowchart diagram 800 according to an embodiment.

The message flow indicated in FIG. 8 takes place between an energy receiver 801, for example the mobile phone 301, and an energy sender 802, for example the energy supply device 302.

At 803, the energy receiver 801 authorizes itself at the energy sender 802, for example using a challenge response message pair, as shown with reference to FIG. 4.

For example, during the authorization at 803, one or several keys are negotiated in an analog manner to the authorization at 703, which has been explained making reference to FIG. 7.

At 804, the energy receiver 801 and the energy sender 802 negotiate a test signal (or several test signals) to be used for the estimation of the transmission characteristics. This may be done encrypted, for example by indicating via the energy sender 802 or also by indicating via the energy receiver 801 which test signal should be used for estimating the transmission characteristics.

At 805, the energy sender 802 sends the negotiated test signal (or the negotiated test signals) to the energy receiver 801.

At 806, the energy receiver 801 determines, based on the transmitted test signal (or the transmitted test signals) the transmission characteristics of a transmission from the energy sender to the energy receiver 801.

At 807, the energy receiver 801 transmits the determined transmission characteristics to the energy sender 802 using an encrypted message 808. As an alternative, the energy receiver 801 may determine transmission parameters for an energy transmission to the energy sender 802 to the energy receiver 801 from the transmission characteristics which it has determined, and transmit these using the encrypted message 808 to the energy sender 802.

At 809, the energy sender 802 sends energy to the energy receiver 801 according to transmission parameters determined based on the transmission characteristics.

According to an embodiment, the transmission characteristics or the transmission parameters may be transmitted from the energy receiver 801 to the energy sender 802 using a message signed (signature) by the energy receiver 801 such that the energy sender 802 can make sure that the transmission parameter or the transmission characteristics are transmitted from an energy receiver which is authorized for receiving energy from the energy sender 802.

Various embodiments provide an efficient way for wirelessly transmitting energy to a selected receiver.

According to an embodiment, a determining device for determining a transmission parameter for wirelessly transmitting energy from a sending device to a receiving apparatus (for example an electronic apparatus) is provided, which comprises: an authorization checking device configured to carry out an authorization in order to determine whether a receiving apparatus is allowed to receive energy from the sending device; a sending/receiving apparatus which is configured to send and receive messages when exchanging messages with the receiving apparatus in order to determine the transmission parameter; and a parameter determining device which is configured to determine the transmission parameter based on the authorization and based on the message exchange if the receiving apparatus is allowed to receive energy from the sending device.

According to an embodiment, the determination of the transmission parameter for the energy transfer to a receiving apparatus is coupled to the authorization of the receiving apparatus, for example to an authorization at the sending device. According to an embodiment, it can be in particular avoided that an undesired receiver to which no energy should be transferred from the viewpoint of the operator of the sending device, can manipulate the transmission parameters used by the sending device in a way that energy can be efficiently transmitted to the undesired receiver.

The determination of the transmission parameter based on the authorization may for example include that an exchanged message is encrypted according to an encryption scheme negotiated at the authorization, or according to one or more keys negotiated at the authorization. The determining of the transmitting parameter based on the authorization may also include that a message individually selected for the authorized receiving apparatus, for example an individual test message, is selected for the receiving apparatus. Moreover, the determining of the transmission parameter based on the authorization may also include that the transmission parameter is only determined if an authorized receiving apparatus exists.

According to an embodiment, the transmission parameter is determined based on the transmission of a test message from the receiving apparatus to the sending device, or from the sending device to the receiving apparatus.

The determining device may further include a selection device configured to select the test message.

The test message may be individually selected for the receiving apparatus.

According to an embodiment the transmission parameter indicates a property of an energy signal via which energy is transmitted from the sending device to the receiving apparatus.

The parameter determining device may be configured to determine the transmission parameter in a way that the energy signal fulfils a predetermined optimum criteria.

The optimum criteria may for example be a criteria regarding the transmission efficiency to be expected using the energy signal. The transmission efficiency to be expected may for example be determined based on a transmission model, the respective transmission parameter, and the determined transmission characteristics.

The authorization may for example be carried out based on an authorization message sent from the receiving apparatus to the authorization checking device.

According to an embodiment, the parameter determining device is positioned within the sending device.

According to an embodiment, the parameter determining device is positioned within the receiving apparatus.

The receiving apparatus may for example be a mobile receiving apparatus, for example an electronic communication apparatus.

According to an embodiment, the determining device is configured to determine the transmission parameter if a ration between the amount of energy radiated from the sending device and the amount of energy which is provided to the receiving apparatus through the radiated energy lies above a predetermined threshold value.

According to an embodiment, an energy supply device including a determining device as described above, is provided.

According to an embodiment, a method for determining of a transmission parameter usable for wirelessly transmitting energy from a sending device to a receiving apparatus is provided, which includes: carrying out of a authorization in order to determine whether the receiving apparatus is authorized to receive energy from the sending device; sending and receiving of messages when exchanging messages with the receiving apparatus in order to determine the transmission parameter; and determining of the transmission parameter based on the authorization, and based on the message exchange, if the receiving apparatus is authorized to receive energy from the sending device.

According to an embodiment, an energy transmitting device for wirelessly transmitting energy to a receiving apparatus is provided, including: a sending device which is configured to radiate energy; a receiving apparatus which is configured to receive a message from the receiving apparatus, from which the amount of energy which has been provided to the receiving apparatus through the radiated energy can be determined; a comparison device which is configured to compare the amount of radiated energy with the amount of energy provided to the receiving apparatus; and a controlling device which is configured to control, based on the comparison, the sending device to further radiate energy to the receiving apparatus.

According to an embodiment, it is determined how large the part of the energy which is received by the receiving apparatus is, compared to the (whole) radiated energy. If this part is low, for example if the ratio of received energy to radiated energy lies below a predetermined threshold value, it can be assumed that an undesired receiver receives a part of the radiated energy, or could receive this part of the radiated energy. In this case, the transmission parameters of the transmission could be changed, for example a different energy signal could be used for transmission which may differ from the energy signal used before for example in phase or in the used frequency range.

The comparison device may for example be configured to determine the ratio of the amount of energy radiated from the sending device to the amount of energy provided to the receiving apparatus through the radiated energy.

The controlling device may for example be configured to control a determining device for determining of a transmission parameter for transmitting energy, if the ratio of the amount of energy radiated from the sending device to the amount of energy which is provided to the receiving apparatus through the radiated energy lies above a predetermined threshold value.

The controlling device may for example be configured to interrupt the radiating of energy to the receiving apparatus if no transmission parameters can be determined for which a lower ratio of the amount of energy radiated from the sending device to the amount of energy which is provided to the receiving apparatus through the radiated energy is to be expected than the determined ratio.

According to an embodiment the controlling device is configured to control the determining device at a later point of time to determine a transmission parameter for the transmission of energy, if the radiation of the energy is interrupted.

The receiving apparatus may for example be a mobile electronic apparatus.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. Determining device for determining a transmission parameter of a wireless energy transmission from a sending device to a receiving apparatus, the determining device comprising:
   an authorization checking device which is configured to carry out an authorization in order to determine whether the receiving apparatus is authorized to receive energy from the sending device;
   a sending/receiving apparatus which is configured to send and receive messages during a message exchange with the receiving apparatus in order to determine the transmission parameter; and
   a parameter determining device which is configured to determine the transmission parameter based on the authorization and based on the message exchange, if the receiving apparatus is authorized to receive energy from the sending device, wherein based on the transmission of a test message between the receiving apparatus and the sending device, pulse responses of the transmission channels between the sending device and the receiving apparatus are determined.

2. The determining device according to claim 1, further comprising:
   a selection device being configured to select the test message.

3. The determining device according to claim 2,
   wherein the test message is selected individually for the receiving apparatus.

4. The determining device according to claim 1,
   wherein the transmission parameter indicates a property of an energy signal via which the energy is transmitted from the sending device to the receiving apparatus.

5. The determining device according to claim 1,
   wherein the parameter determining device is configured to determine the transmission parameter such that the energy signal fulfills a predetermined optimum criterion.

6. The determining device according to claim 5,
   wherein the optimum criterion is a criterion regarding the transmission efficiency to be expected when using the energy signal.

7. The determining device according to claim 1,
   wherein the authorization is carried out based on an authorization message sent out by the receiving apparatus to the authorization checking device.

8. The determining device according to claim 1,
   wherein the parameter determining device is located within the sending device.

9. The determining device according to claim 1,
   wherein the parameter determining device is located within the receiving apparatus.

10. The determining device according to claim 1,
    wherein the receiving apparatus is a mobile electronic device.

11. The determining device according to claim 1,
    wherein the determining device is configured to determine the transmission parameter if the ratio of the amount of energy radiated from the sending device to the amount of energy supplied to the receiving apparatus via the radiated energy lies above a predetermined threshold value.

12. An energy supply device, comprising:
    a determining device for determining a transmission parameter of a wireless energy transmission from a sending device to a receiving apparatus, the determining device comprising:
    an authorization checking device which is configured to carry out an authorization in order to determine whether the receiving apparatus is authorized to receive energy from the sending device;
    a sending/receiving apparatus which is configured to send and receive messages during a message exchange with the receiving apparatus in order to determine the transmission parameter; and
    a parameter determining device which is configured to determine the transmission parameter based on the authorization and based on the message exchange, if the receiving apparatus is authorized to receive energy from the sending device, wherein based on the transmission of a test message between the receiving apparatus and the sending device, pulse responses of the transmission channels between the sending device and the receiving apparatus are determined.

13. A method for determining a transmission parameter of a wireless energy transmission from a sending device to a receiving apparatus, the method comprising:
    carrying out an authorization in order to determine whether the receiving apparatus is authorized to receive energy from the sending device;
    sending and receiving of messages during a message exchange with the receiving apparatus in order to determine the transmission parameter; and
    determining of the transmission parameter based on the authorization and based on the message exchange if the receiving apparatus is authorized to receive energy from the sending device, wherein based on the transmission of a test message between the receiving apparatus and the sending device, pulse responses of the transmission channels between the sending device and the receiving apparatus are determined.

14. An energy transmitting device for wirelessly transmitting energy to a receiving apparatus, the energy transmitting device comprising:
    a sending device configured to radiate energy by means of energy sending signals;
    a receiving device configured to receive a message from the receiving apparatus, from which the amount of energy which has been supplied to the receiving apparatus using the radiated energy can be determined;

a comparing device being configured to compare the amount of radiated energy with the amount of energy supplied to the receiving apparatus;

a controlling device being configured to control the sending device to radiate energy by means of other energy sending signals optimized for the energy transmission from the sending device to the receiving apparatus in accordance with estimated pulse responses of the transmission channels between the energy transmitting device and the receiving apparatus if the ratio of the amount of energy supplied to the receiving apparatus and the amount of radiated energy is below a predetermined threshold.

15. The energy transmitting device according to claim 14, wherein the comparison device is configured to determine the ratio of the amount of energy radiated by the sending device to the amount of energy provided to the receiving apparatus using the radiated energy.

16. The energy transmitting device according to claim 15, wherein the controlling device is configured to control a determining device in order to determine a transmission parameter for transmitting the energy if the ratio of the amount of the energy radiated by the sending device to the amount of energy provided to the receiving apparatus via the radiated energy lies above a predetermined threshold value.

17. The energy transmitting device according to claim 16, wherein the controlling device is configured to interrupt the radiation of energy to the receiving apparatus if no transmission parameters can be determined based on which a lower ratio of the amount of energy radiated by the sending device to the amount of energy provided to the receiving apparatus via the radiated energy as the determined ratio is to be expected.

18. The energy transmitting device according to claim 17, wherein the controlling device is configured to control the determining device at a later point of time in order to determine a transmission parameter for transmission of energy, if the radiation of energy is interrupted.

19. The energy transmitting device according to claim 14, wherein the receiving apparatus is a mobile electronic apparatus.

20. A method for wirelessly transmitting energy from a sending device to a receiving apparatus, the method comprising:

receiving a message from the receiving apparatus, from which the amount of energy which is supplied to the receiving apparatus via energy radiated by means of energy signals can be determined;

comparing the amount of radiated energy with the amount of energy supplied to the receiving apparatus; and controlling the sending device to radiate energy by means of other energy sending signals optimized for the energy transmission from the sending device to the receiving apparatus in accordance with estimated pulse responses of the transmission channels between the energy transmitting device and the receiving apparatus if the ratio of the amount of energy supplied to the receiving apparatus and the amount of radiated energy is below a predetermined threshold.

* * * * *